United States Patent [19]

Iri et al.

[11] Patent Number: 4,921,325
[45] Date of Patent: May 1, 1990

[54] CONNECTOR FOR OPTICAL FIBER RIBBON AND A METHOD OF ATTACHING THE SAME

[75] Inventors: Eiji Iri; Yasunari Nobuoka, both of Itami; Nobuo Suzuki; Yoshio Kashima, both of Matsudo; Yuji Kakutani; Osamu Murata, both of Shiobara, all of Japan

[73] Assignees: Mitsubishi Cable Industries, Ltd., Amagasaki; Seiko Instruments, Inc., Tokyo, both of Japan

[21] Appl. No.: 288,137

[22] Filed: Dec. 22, 1988

[30] Foreign Application Priority Data

Dec. 25, 1987 [JP] Japan .............................. 62-198736[U]
Jun. 24, 1988 [JP] Japan .............................. 63-84177[U]
Aug. 5, 1988 [JP] Japan .............................. 63-104357[U]

[51] Int. Cl.[5] .............................................. G02B 6/38
[52] U.S. Cl. ................................. 350/96.21; 350/96.2; 350/96.22
[58] Field of Search ................... 350/96.2, 96.21, 96.22

[56] References Cited

U.S. PATENT DOCUMENTS

| 4,214,812 | 7/1980 | de Mendez | 350/96.21 |
| 4,272,154 | 6/1981 | Bachel | 350/96.22 |
| 4,279,468 | 7/1981 | Turley et al. | 350/96.22 X |
| 4,458,985 | 7/1984 | Balliet et al. | 350/96.21 |
| 4,515,434 | 5/1985 | Margolin et al. | 350/96.21 |
| 4,519,672 | 5/1985 | Rogstadius | 350/96.2 |
| 4,575,183 | 3/1986 | Parchet et al. | 350/96.22 |
| 4,690,495 | 9/1987 | Giannini | 350/96.21 |
| 4,824,197 | 4/1989 | Patterson | 350/96.21 |

FOREIGN PATENT DOCUMENTS 61-7813 1/1986 Japan .............................. 350/96.21
63-43108 3/1988 Japan .

Primary Examiner—William L. Sikes
Assistant Examiner—John Ngo
Attorney, Agent, or Firm—Burns, Doane, Swecker & Mathis

[57] ABSTRACT

The present invention relates to a connector for connecting optical fiber ribbons to each other, each of ribbons including a plurality of optical fibers spaced in line, and a method of attaching the same. The connector comprises an alignment member for placing the optical fibers in the grooves formed therein, a deformable metal member disposed on the optical fibers in the grooves of the alignment member, and a ferrule incorporated at the front end pportion with both the alignment member and the deformable metal member and adapted at the rear end portion to retain the unexposed portion of the optical fiber ribbon. Accordingly, the optical fibers are fixedly held between the alignment member and the deformable metal member while the ribbon is fixedly held by the rear end portion of the ferrule. The front ends of the optical fibers are cut at the front end of the ferrule. As the result, the optical fiber ribbon can remain fastened firmly and securely for a long period of time and additionally, its attaching work can be made with ease within a short time.

17 Claims, 18 Drawing Sheets

CONNECTOR FOR OPTICAL FIBER RIBBON AND A METHOD OF ATTACHING THE SAME

BACKGROUND OF THE INVENTION

1. Field of the Invention

The present invention relates to a connector for connecting optical fiber ribbons to each other, each of which includes a plurality of optical fibers provided in parallel arrangement, and a method of attaching the same.

2. Description of the Prior Art

There is a known connector for optical fiber ribbon which employs a method of fixedly securing the optical fiber ribbon to its main body by the use of adhesive agent for retaining.

Such a prior art method, however, requires a considerable period of time for hardening of the adhesive agent and thus, its major disadvantage is that the workability in assembly is inferior. Also, when adhesive agent of two-liquid mixture type is used, the adhesive strength may not become constant due to mis-composition and the reliability of a connector will be declined.

SUMMARY OF THE INVENTION

The present invention is directed, to overcome the above mentioned problems, towards a connector for optical fiber ribbon which comprises an alignment member for placing optical fibers in the grooves formed therein, a deformable metal member disposed on the optical fibers on the alignment member, and a ferrule incorporated at the front end portion with both the alignment member and the deformable metal member and adapted at the rear end portion to retain the unexposed portion of the optical fiber ribbon. Accordingly, the optical fibers are fixedly held between the alignment member and the deformable metal member while the ribbon is fixedly held by the rear end portion of the ferrule. The ends of optical fibers are cut at the front end of the ferrule.

A first object of the present invention is to provide a connector for optical fiber ribbon which allows the optical fiber ribbon to be securely fastened therein.

A second object of the present invention is to provide a connector for optical fiber ribbon which allows the optical fiber ribbon to remain fixed therein for a long period of time constantly.

A third object of the present invention is to provide a connector for optical fiber ribbon in which no distortion on optical fibers is induced.

A fourth object of the present invention is to provide a connector for optical fiber ribbon in which nonslip powder is provided between the optical fibers and the deformable metal member so that the optical fibers can be prevented from projecting from the front end of the connector due to a change in the temperature, vibration, etc.

A fifth object of the present invention is to provide a connector for optical fiber ribbon in which nonslip powder is provided between the optical fibers and the deformable metal member so that the optical fibers can securely be fastened and remain fixed for a long period of time constantly.

A sixth object of the present invention is to provide a connector for optical fiber ribbon in which a pressing member is provided for depressing the deformable metal member so that the optical fibers can be fastened securely.

A seventh object of the present invention is to provide a connector for optical fiber ribbon in which the ferrule has a key at rear end thereof and also a wedge is provided with a key way into which the key is fitted, so as to reduce the number of components for retaining the fiber ribbon.

An eighth object of the present invention is to provide an improved method of attaching a connector for optical fiber ribbon in which the attaching work can be made with ease.

A ninth object of the present invention is to provide an improved method of attaching a connector for optical fiber ribbon in which the attaching work can be in a short period of time.

The above and further objects and features of the invention will more fully be apparent from the following detailed description with accompanying drawings.

DESCRIPTION OF THE PREFERRED EMBODIMENTS

Preferred embodiments of the present invention will be described in detail.

Figure 1:
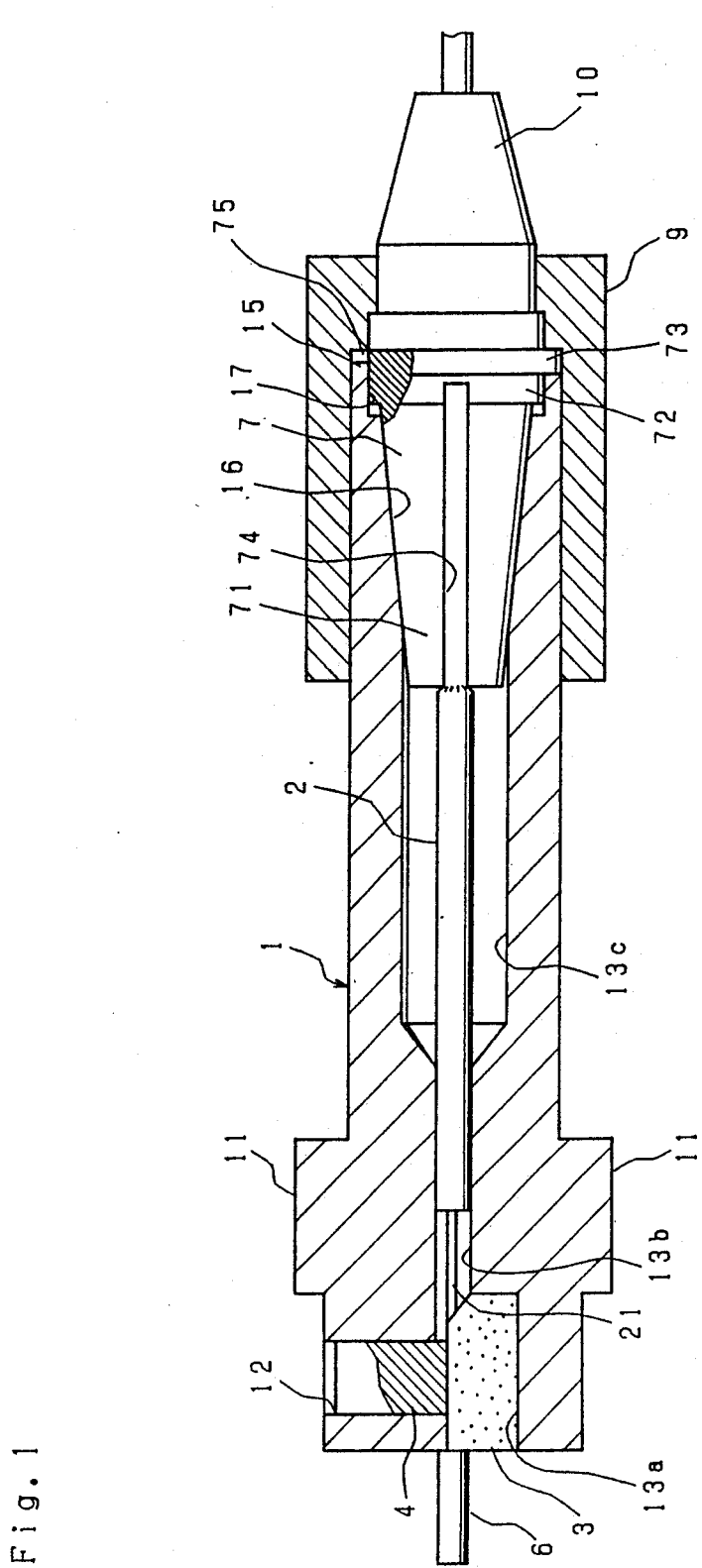
FIG. 1 is a partially cutaway longitudinal cross sectional view showing a first embodiment of the present invention.
Figure 2:
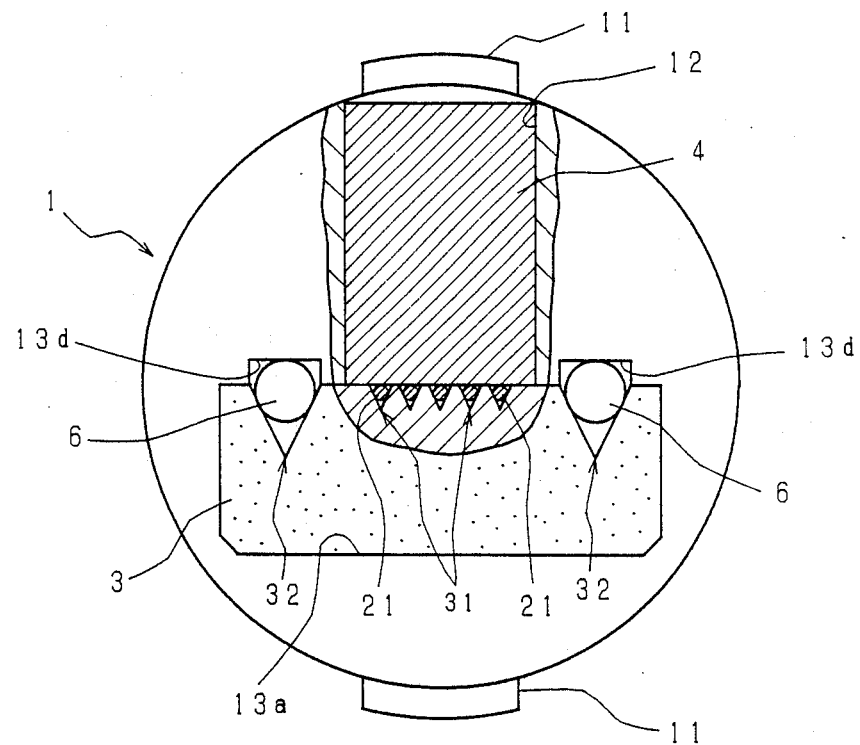
FIG. 2 is a partially cutaway enlarged front view of the first embodiment of the present invention.
Figure 3:
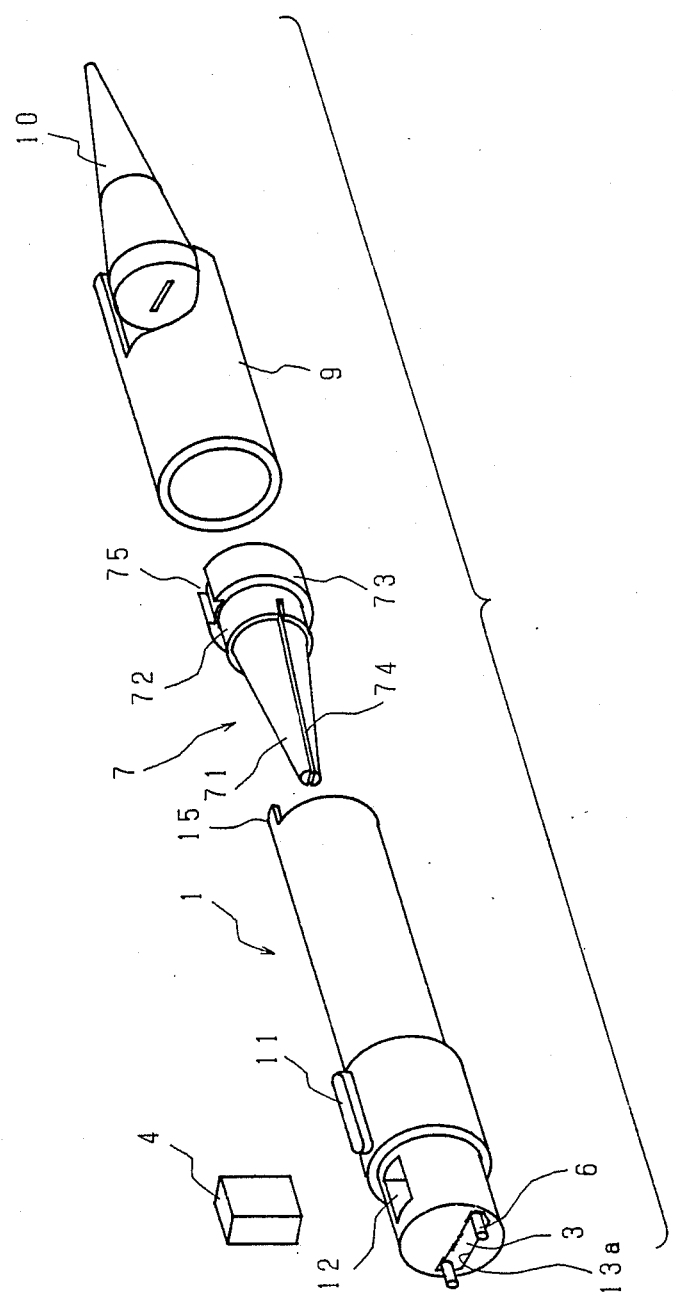
FIG. 3 is an exploded perspective view of the first embodiment of the present invention.

FIG. 1 is a partially cutaway longitudinal cross sectional view showing a first embodiment of the present invention in the form of a connector for optical fiber ribbon (as illustrated in cross section, except for an optical fiber 21, a optical fiber ribbon 2, a wedge 7, and a boot 10, and designated similarly in FIGS. 5, 7, 9, 11, 15, and 18). FIG. 2 is a partially cutaway enlarged front view of the first embodiment while FIG. 3 is an exploded perspective view of the same.

There is provided a ferrule 1 of cylindrical shape having a flat shaped bore 13b of flattened shape in cross section formed in the frontward portion thereof in which an optical fiber ribbon 2 extends axially. The flat shaped bore 13b is communicated at front with an enlarged opening 13a formed in the front end portion of the ferrule 1 and at rear, with an enlarged opening 13c formed in the rear end portion of the same. Although the ferrule 1 costs less of plastic material, it may be formed of metal.

Figure 4:
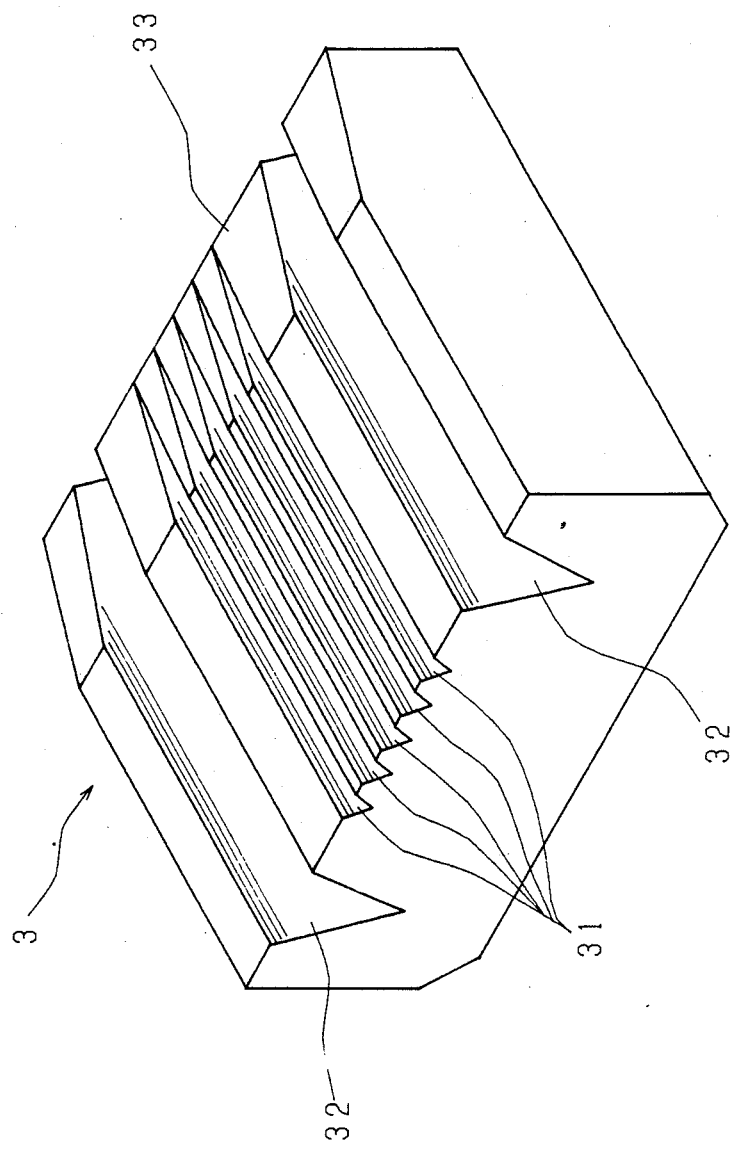
FIG. 4 is a perspective view of an alignment member incorporated in the first embodiment of the present invention.

The optical fiber ribbon 2 comprises a plurality (e.g. five) of optical fibers 21, each of them being jacketed with a primary layer and a buffer layer, arranged in parallel and jacketed with an outer layer so that it can be of flat ribbon-like shape. The optical fibers 21, as being exposed with their primary, buffer, and outer layers skinned off, extend from the intermediate of the flat shaped bore 13b to the upper region of the front enlarged opening 13a. There is an alignment member 3 of rectangular shape, specifically shown in FIG. 4, fitted into the enlarged opening 13a. The alignment member 3 has a plurality (5 in this embodiment) of equally spaced V-shaped grooves 31 formed in the upper face thereof so as to extend parallel to the axis of the ferrule 1. The grooves 31 are spaced from each other so as to correspond to the equally spaced optical fibers 21 in the optical fiber ribbon 2. Accordingly, the optical fibers 21 are placed in grooves 31 respectively. Each groove 31 may be formed at an angle of about 70 degrees in the bottom, particularly in consideration of the stability and proper intervals of the equally spaced optical fibers 21 in the optical fiber ribbon 2, so that the uppermost ends of the optical fibers 21 can be on a level equal to or a bit lower than the upper face of the alignment member 3. In this arrangement, the optical fibers 21 can easily be fitted into the V-shaped grooves 31 in the alignment member 3 during the inserting of the optical fibers 21 into the ferrule 1.

There are provided a couple of large V-shaped grooves 32, 32, greater in size, arranged parallel to and on both the sides of the grooves 31—31 in the alignment member 3. The ferrule 1 has also a couple of grooves 13d which are formed therein at the upper of the enlarged opening 13a so as to face the large grooves 32 respectively. Accordingly, the corresponding grooves 32 and 13d constitute a couple of guide pin insertion holes respectively into which guide pins 6, 6 can be inserted.

The alignment member 3 is provided with a downwardly sloping face 33 formed on the rearward end of the upper face. The lowermost end of the sloping face 33 is arranged about on a level with the bottom of the groove 31. The alignment member 3 is formed of ceramic material such as zirconia or alumina and may be of soft metal material such as aluminium, zinc, or alloy including both.

The ferrule 1 has at the front end portion also a slot 12 formed there at a right angle to the optical fibers 21 disposed in the grooves 31. The slot 12 has a diameter slightly smaller than the distance between the large grooves 32 and is adapted to accept a pressing means 4 therein which is of cylindrical or rectangular solid body and approximately equal in width to the slot 12. The deformable metal member 4 intends to be deformed under pressure in order to offset a fault in the diameter of the optical fibers 21 and in the shape of the V-shaped grooves 31 and thus, to hold the optical fibers 21 tightly by means of a uniform force of pressing. Accordingly, the deformable metal member 4 is preferably provided having a durable property against a change of ambiences such as in the temperature and formed from e.g. lead, indium, tin, zinc, solder, or soft copper; particularly, lead is most preferable as offering good workability with its high plasticity and also, being available at low cost.

The ferrule 1 is provided with an axially extending positioning guide 11 formed on the central outer periphery thereof and particularly at the rearmost end, a projection designated as a twist-locking key 15.

The numeral 7 is a wedge of truncated-conical shape and formed from plastic, which is inexpensive, or metal material. The wedge 7 incorporates a conical section 71 tapered frontwardly so as to fit into a conical opening 16 provided in the ferrule 1, a cylindrical section 72 connected to the enlarged end of the conical section 71, and a flange section 73 connected, in turn, to the cylindrical section 72. The outer diameter of the cylindrical section 72 is approximately equal to the inner diameter of a circular opening 7 provided in the ferrule 1 while the outer diameter of the flange section 73 is approximately equal to the outer diameter of the ferrule 1. There is provided a center bore extending axially throughout the cylindrical and flange sections 72, 73 and communicated to a slit 74 which is cut along the axial of the wedge 7 so as to extend from the front end of the conical section 71 to the intermediate of the cylindrical section 72. The flange section 73 is provided with a recess formed therein which is designated as a key way 75 for engagement with the twist-locking key 15.

The numeral 10 is a boot for protecting a optical fiber ribbon installed, which is fitted through the bottom of a cup-like sleeve 9.

A procedure of attaching the connector arranged as depicted above will be described. The front end portion of the optical fiber ribbon 2 is skinned off a length of sheath and the optical fiber ribbon 2 is inserted through the sleeve and boot 9, 10 into the wedge 7. The wedge 7 is then fitted into the ferrule 1 with the key way 75 engaging with the twist-locking key 15. At the time, the wedge 7 is stressed so that the slit 74 becomes narrow. This allows the optical fiber ribbon 2 to be retained in the wedge 7. The optical fibers 21 exposed from the optical fiber ribbon 2 are then placed, at the front end portion of the ferrule 1, in the grooves 31 as inserted from the sloping face 33 side. As the deformable metal member 4 is pressed into the slot 12, the optical fibers 21 are securely held between. Finally, extensions of the optical fibers 21 projecting from the front face of the ferrule 1 are cut away, if necessary, ground off.

Figure 5:
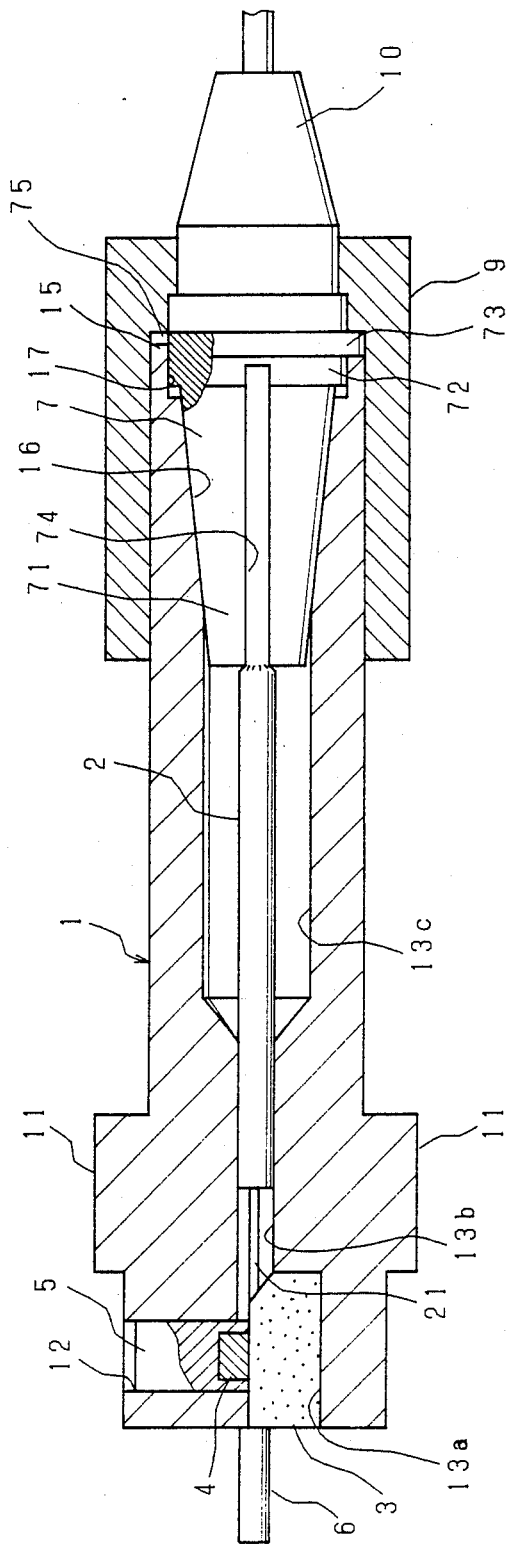
FIG. 5 is a partially cutaway longitudinal cross sectional view showing a second embodiment of the present invention.
Figure 6:
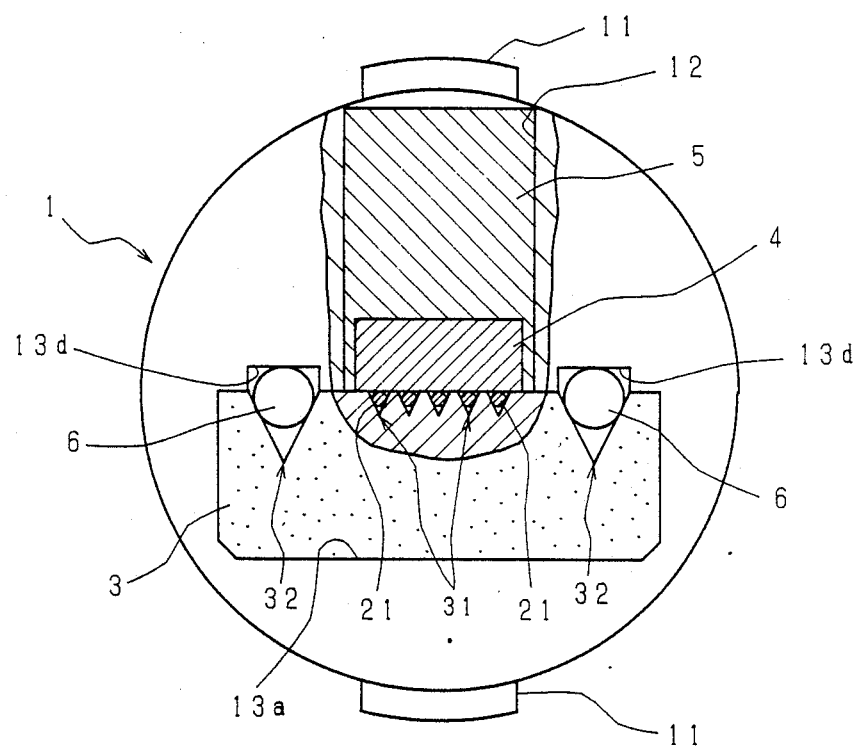
FIG. 6 is a partially cutaway enlarged front view of the second embodiment of the present invention.

FIG. 5 is a partially cutaway longitudinal cross sectional view showing a second embodiment of the present invention while FIG. 6 is a partially cutaway enlarged front view of the same.

According to the second embodiment, there is additionally provided a pressing member 5 in the connector of the first embodiment in order to press against the deformable metal member 4. The pressing member 5 is also fitted into the slot 12 at the front end portion of the ferrule 1, which has either a cylindrical or rectangular solid shape and arranged approximately equal in width to the slot 12. The pressing member 5 is provided with a square recess formed in the bottom thereof and having a width greater than the distance between the two grooves 31 at both ends so as to accommodate the deformable metal member 4 therein. As the pressing member 5 is pressed down into the slot 12, the deformable metal member 4 presses against the optical fibers 21 so that they are retained in their respective grooves 31 in the alignment member 3. Preferably, the deformable metal member 4 is formed in an appropriate size and thickness so that it can exert a pressure on each of the optical fibers 21 as being accepted in the recess of the pressing member 5 which is kept under pressure in the slot 12.

The other components, e.g. a wedge 7, in this embodiment are similar to ones in the first embodiment as thus, represented by similar numbers and will be omitted in the description. Although a procedure of attaching the connector is much the same as in the first embodiment, the retaining of the optical fibers 21 is much improved as compared to the first embodiment because the second embodiment employs the pressing member 5 to press the deformable metal member 4.

Figure 7:
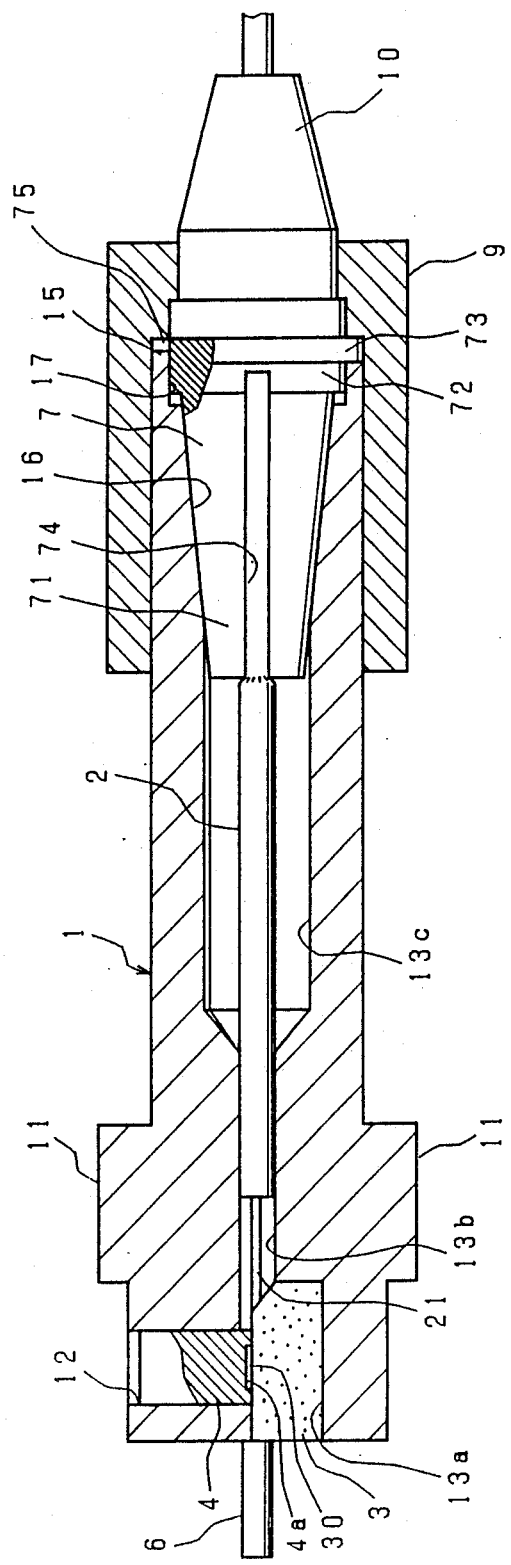
FIG. 7 is a partially cutaway longitudinal cross sectional view showing a third embodiment of the present invention.
Figure 8:
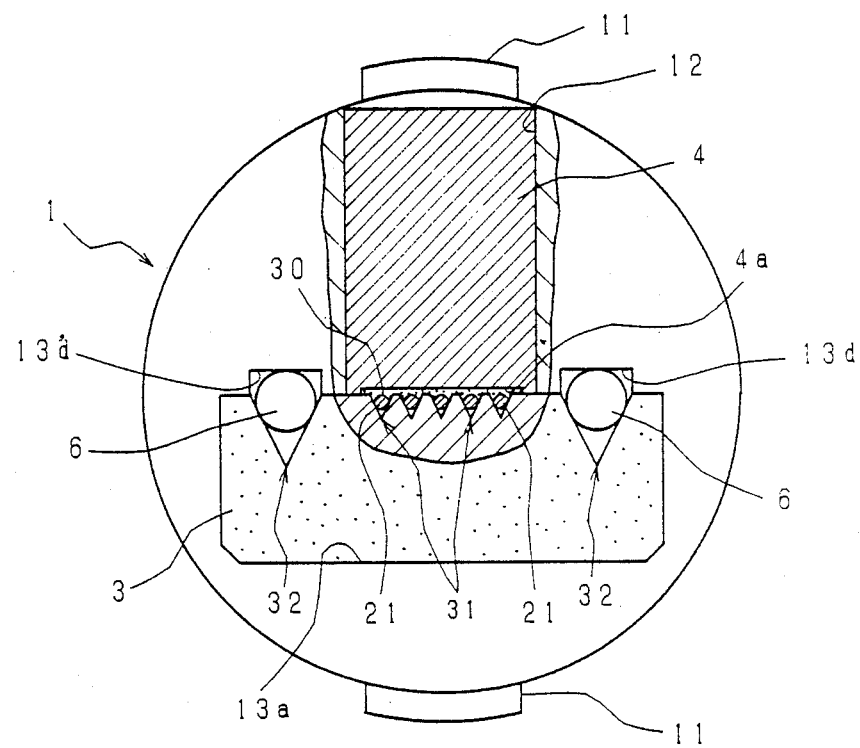
FIG. 8 is a partially cutaway enlarged front view of the third embodiment of the present invention.

FIG. 7 is a partially cutaway longitudinal cross sectional view showing a third embodiment of the present invention while FIG. 8 is a partially cutaway enlarged front view of the same.

According to the third embodiment, there is a nonslip powder provided between the alignment member 3 and the deformable metal member 4. The deformable metal member 4 is provided with a square recess 4a formed in the bottom thereof so as to correspond to the grooves 31 in the alignment member 3 and having a small depth and a width slightly greater than the distance between the two farside grooves 31 in the alignment member 3. Particularly, particles (at least less than 0.5 μm) of nonslip powder 30, e.g. of alumina or zirconia ceramic, are provided in the recess 4a. The deformable metal member 4 when pressed into the slot 12 exerts a pressure via the nonslip powder 30 on each of the optical fibers 21 so that they are securely retained in their respective grooves 31 in the alignment member 3.

In the third embodiment as well as the first and second embodiments, the optical fiber ribbon 2 is fixedly held by the ferrule 1 with its optical fibers 21 arranged in the grooves 31 in the alignment member 3. The optical fibers 21 are securely held between the grooves 31 and the recess 4a, where the nonslip powder 30 is provided, by the alignment member 3 and the deformable metal member 4. Accordingly, as there is the nonslip powder 30 on the corresponding surfaces for holding in this embodiment, the direct retaining of the optical fibers 21 with the deformable metal member 4, which has a tendency to become slippery during a considerable period of time due to smoothing of the holding surface, is improved in tightness and remains constant for long.

Figure 9:
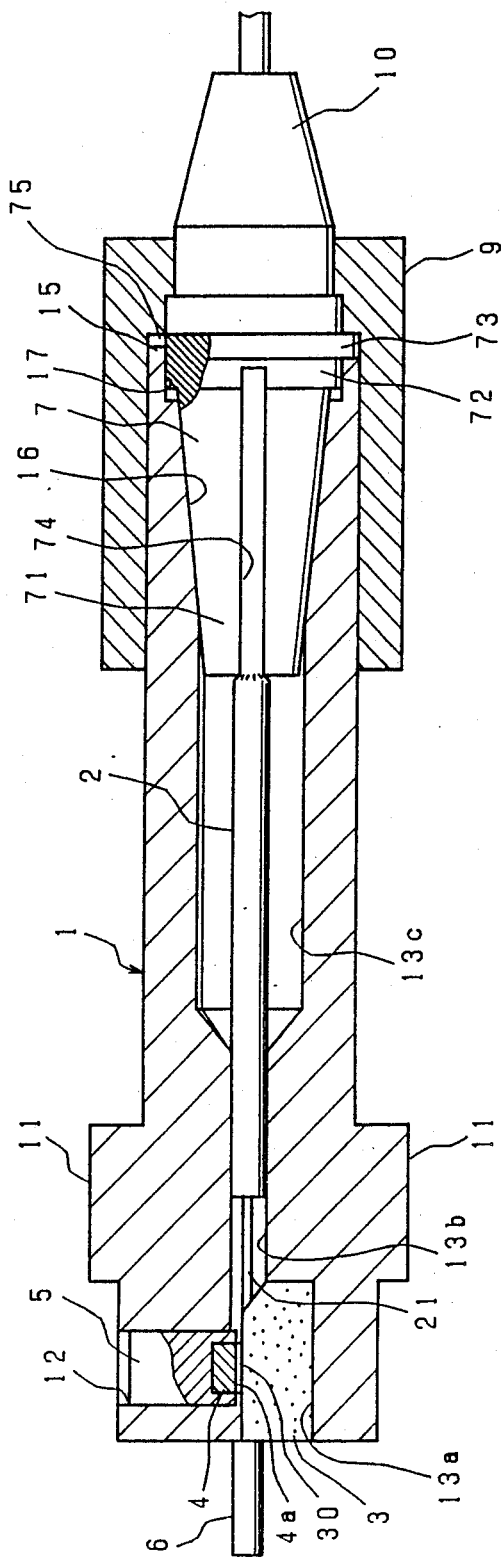
FIG. 9 is a partially cutaway longitudinal cross sectional view showing a fourth embodiment of the present invention.
Figure 10:
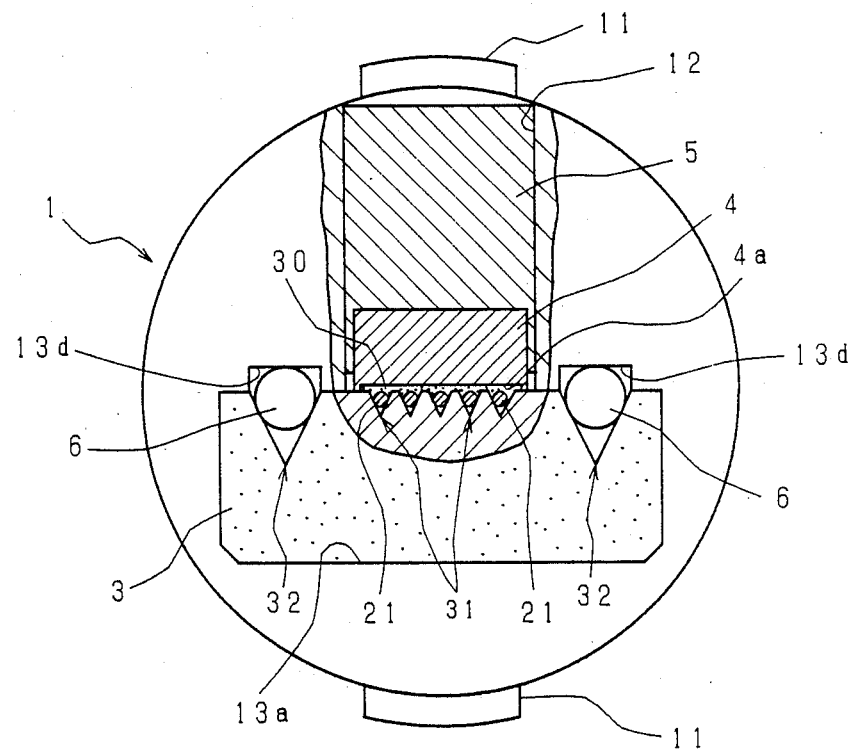
FIG. 10 is a partially cutaway enlarged front view of the fourth embodiment of the present invention.

FIG. 9 is a partially cutaway longitudinal cross sectional view showing a fourth embodiment of the present invention while FIG. 10 is a partially cutaway enlarged front view of the same. The fourth embodiment is equal to the third embodiment with a similar pressing member 5 employed.

Similarly as in the second embodiment, the pressing member 5 is fitted into the slot 12 at the front end portion of the ferrule 1. The deformable metal member 4 is accommodated in the recess, similar to one in the second embodiment, formed in the bottom of the pressing member 5. The deformable metal member 4 is provided with also the recess 4a in which the nonslip powder 30 is provided similar to one in the third embodiment. As the pressing member 5 is pressed into the slot 12, the deformable metal member 4 exerts a pressure on each of the optical fibers 21 so that they are securely retained in the grooves 31 in the alignment member 3.

Figure 11:
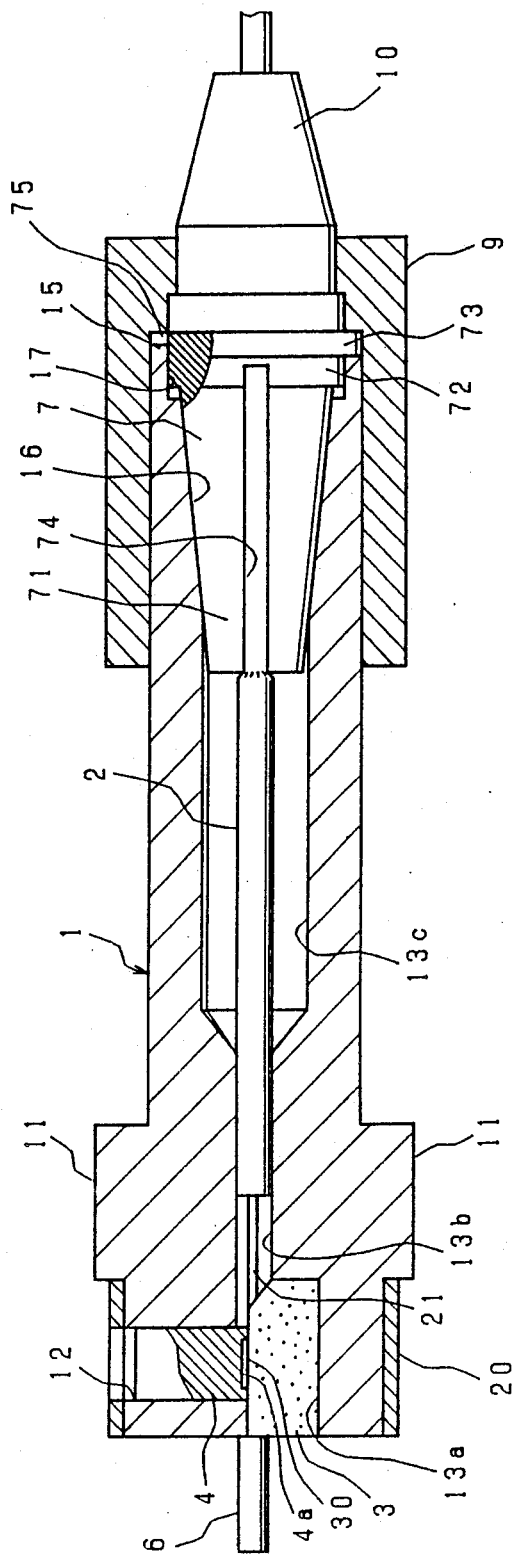
FIG. 11 is a partially cutaway longitudinal cross sectional view showing a fifth embodiment of the present invention.
Figure 12:
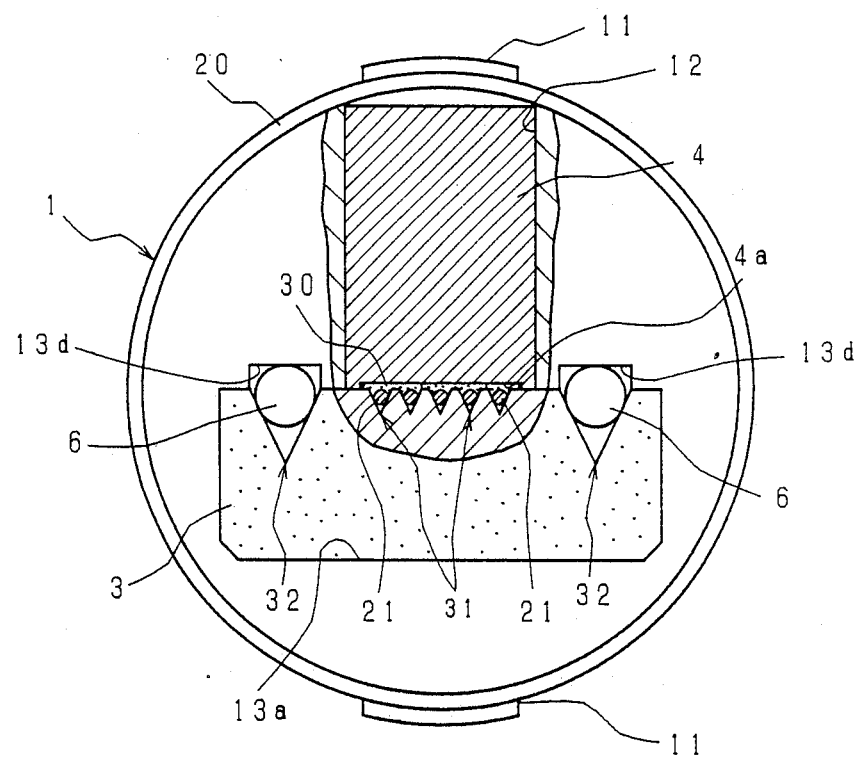
FIG. 12 is a partially cutaway enlarged front view of the fifth embodiment of the present invention.
Figure 13:
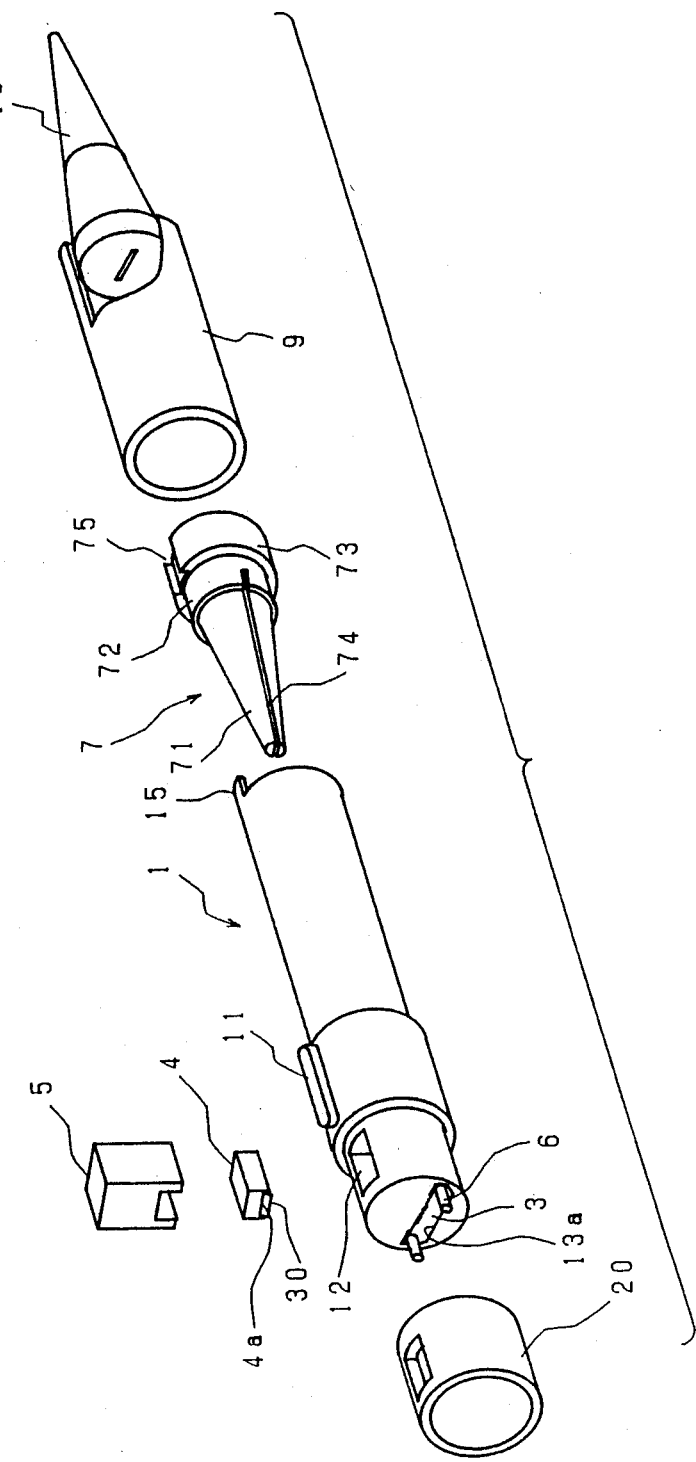
FIG. 13 is an exploded perspective view showing a sixth embodiment of the present invention.

FIG. 11 is a partially cutaway longitudinally cross sectional view showing a fifth embodiment of the present invention while FIG. 12 is a partially cutaway enlarged front view of the same. The fifth embodiment is equal to the third embodiment with a ring 20 adapted to fit onto the front end portion of the ferrule 1. FIG. 13 is an exploded perspective view showing a sixth embodiment of the present invention which is equal to the fourth embodiment with a similar ring 20.

According to the fifth and sixth embodiments, the wedge 7 is fitted into the ferrule 1 for retaining of the fiber ribbon and then, the ring 20 is fitted onto the front end portion of the ferrule 1 prior to the retaining and treatment of the optical fibers 21 in the same manner as of the previously mentioned embodiment. In this arrangement of the fifth or sixth embodiment, the ring 20 prevents an event that the ferrule 1 is deformed in the front end portion by a counter-stress caused when the deformable metal member 4 is pressed into the slot 12 so that the retaining force declines and also, the guide pins 6 become loose at the retaining areas. Accordingly, the optical fibers 21 and guide pins 6 remain fastened securely.

According to the third, fourth, fifth, and sixth embodiments, the optical fibers 21 remain fastened between the alignment member 3 and the deformable metal member 4 as the retaining force to the optical fibers 21 is increased by providing the nonslip powder 30 between the grooves 31 in the alignment member 3 and the recess 4a in the deformable metal member 4. As a result, the optical fibers 21 can be prevented from projecting from the front end of the ferrule 1 due to a change in the temperature.

The nonslip powder 30 may be provided in such an amount either to keep the alignment member 3 and deformable metal member 4 from each other or to allow them to come in partial contact with each other.

Figure 14:
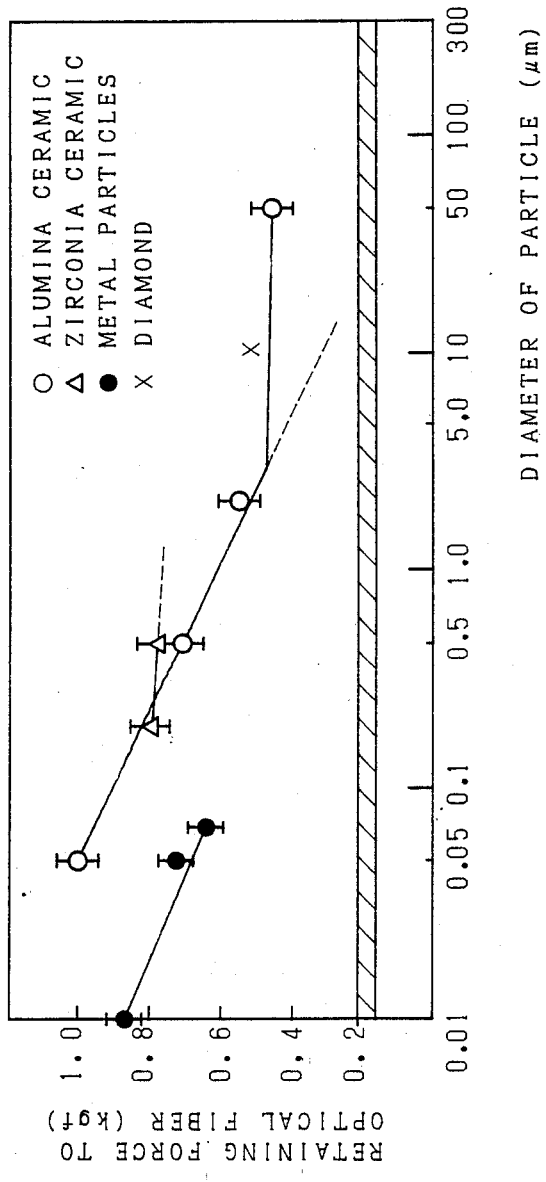
FIG. 14 is a graph showing the resultant retaining force of nonslip powder to optical fiber.

With reference to Table 1 shown below and a graph of FIG. 14 showing the results of a practical performance in which the nonslip powder 30 has been changed in material and in diameter of particle (i.e. an average particle diameter, designated hereinafter), the retaining force of the nonslip powder 30 to the optical fibers 21 will be described.

The graph of FIG. 14 illustrates the diameter (μm) of a particle of the nonslip powder 30 on abscissa axis and the retaining force (kgf) to the optical fibers 21 on vertical axis. The nonslip powder was used of alumina ceramic represented by ○, of zirconia ceramic represented by △, of metallic particles represented by ●, and of diamond particles represented by X. The shaded area represents the retaining force of the deformable metal member 4 to the optical fibers 21 without use of the nonslip powder 30. The results have been given by measuring the retaining force to the optical fibers 21 which were placed on the alignment member 3 and pressed via the nonslip powder 30 with the deformable metal member 4, first at a pressure of 25 kgf and then, at a pressure of 3 kgf after releasing the former pressure.

TABLE 1

| Class | Powder Material | | | Remarks |
|---|---|---|---|---|
| | Item | Particle Diameter (μm) | Force of Retaining Fiber (gf) | |
| Metal | Ni | 0.01 | 843 | |
| | Cu | 0.05 | 748 | |
| | Ag | 0.07 | 618 | |
| | Zirconia | 0.2 | 795 | |
| | | 0.5 | 750 | |
| Ceramic | Alumina | 0.05 | 1000 | |
| | | 0.5 | 690 | |
| | | 2.0 | 550 | Possible |
| | | 3.0 | 450 | Breakage of |
| | | 30~70 | 460 | Fiber |

As shown in the Table 1 and the graph of FIG. 14, the smaller the nonslip powder 30 is in particle diameter, the more the retaining force to the optical fibers 21 increases. Particularly, the nonslip powder 30 of ceramic substances indicates a better property of characteristic as a material. However, when the diameter of a particle, even of ceramic, is more than 1 μm, the retaining force to the optical fibers 21 decreases considerably and thus, the optical fibers 21 may be slipped out from between the alignment member 3 and the deformable metal member 4. Furthermore, the optical fibers 21 may be broken apart. On the other hand, the nonslip powder 30 of metal particles is liable to keep from the deformable metal member 4 although providing a certain force of retaining the optical fibers 21 and thus, cannot be used in associated relationship with the deformable metal member 4. This results in poor workability and regards the metal powder improper to use as the nonslip powder 30 for the retaining of optical fibers.

Accordingly, ceramic material is most proper to act as the nonslip powder 30 and the diameter of its particle should be less than 1 μm and preferably under 0.5 μm.

To retain the optical fibers 21 between the grooves 31 in the alignment member 3 and the recess 4a in the deformable metal member 4 with the nonslip powder 30 interposed, the nonslip powder 30 comprising ceramic particles of less than 0.5 μm in diameter is provided between the recess 4a of the deformable metal member 4 and the optical fibers 21 fitted in parallel in the grooves 31 of the alignment member 3 and then, a pressure of 25 kgf is applied for pressing. Consequently, the optical fibers 21 remain fastened effectively between the alignment member 3 and the deformable metal member 4.

The layer of the nonslip powder 30 in pressing is preferably 0.1 to 0.3 mm in thickness.

Table 2 shows a change in the projection of the optical fibers 21 after the temperature testing in order to confirm the strength of retaining with a combination of the nonslip powder 30 and the deformable metal member 4 made of lead in the connector, shown in FIG. 13, having the ferrule 1 etc. fabricated by plastic forming.

Test A has been executed with the pressing member 5 of FIG. 13 pressing against the deformable metal member 4 of 1 mm in thickness while the nonslip powder 30 of alumina ceramic provided having a diameter of particle of 3 μm. Test B has been executed without the pressing member 5 but with the deformable metal member 4 of 2 mm in thickness and the nonslip powder 30 of zirconium oxide having a diameter of particle of 0.2 μm. The same condition has been given in both Tests A and B that a pressure of 25 kgf was applied to the deformable metal member 4 and then, released while the optical fiber ribbon remained fastened with the wedge 7. A change in the temperature during temperature test was from −30° C. to 60° C. in increase from 60° C. to −30° C. in decrease. An increase and decrease in a cycle was repeated 10 times during heat cycle test. The length of the optical fiber ribbon 2 was 5 m from one end with a connector to the other end with another connector. The retaining force of the nonslip powder 30 to the optical fibers 21 ranged from 700 to 780 gf.

TABLE 2

| Lot No. | Optical Fiber Ribbon No. | Change in Projection of Fiber (μm) | |
|---|---|---|---|
| | | Test A | Test B |
| I | 1 | −1 | +4 |
| | 2 | −4 | +4 |
| | 3 | −2 | +4 |
| | 4 | 0 | +3 |
| | 5 | +3 | +3 |
| II | 1 | −1 | +1 |
| | 2 | −5 | −3 |
| | 3 | −3 | −4 |
| | 4 | −2 | −4 |
| | 5 | −6 | −3 |
| III | 1 | −1 | −9 |
| | 2 | +5 | −9 |
| | 3 | +4 | −12 |
| | 4 | −1 | −8 |
| | 5 | +2 | −10 |
| IV | 1 | −2 | +12 |
| | 2 | −5 | +14 |
| | 3 | −6 | +13 |
| | 4 | −7 | +14 |
| | 5 | −7 | +11 |

The result of the test is that the projection of the optical fibers 21 is about 10 μm and within the target range. Test A shows that when the deformable metal member 4 is employed together with the pressing member 5, the strength of retaining the optical fibers 21 increases and the projection of the optical fibers 21 is less than 10 μm. Although, the pressing-in of the deformable metal member 4 in the connector still provides a sufficient retaining force to the optical fibers and the projection of the optical fibers 21 is kept about 10 μm. Accordingly, an appropriate result can be obtained by selecting the best nonslip powder as effected in Test B in which the deformable metal member 4 is 2 mm in thickness without the use of a pressing member 5 while the nonslip powder 30 is zirconium oxide having a diameter of particle of 0.2 μm.

Through such experimental tests, it is confirmed that the method of retaining the optical fibers 21 between the alignment member 3 and the deformable metal member 4 adopted of lead material with the help of the nonslip powder 30 is effective in this respect and also, in which the optical fibers 21 are prevented from projecting from the front end of the connector due to a change in the temperature.

Although the nonslip powder 30 is provided between the recess 4a formed in the bottom of the deformable metal member 4 and the optical fibers 21 seated in the grooves 31 according to the embodiment, it may directly be attached by adhesive to the bottom of the deformable metal member 4. Also, the nonslip powder 30 may be applied over the crucial area where the optical fibers 21 are placed in the grooves 31 of the alignment member 3 prior to the mounting of the deformable metal member 4. Furthermore, particles of the nonslip powder 30 may be commingled with the material of the deformable metal member 4 during the forming of the deformable metal member 4 so that they can appear on the surface of the deformable metal member 4.

Figure 15:
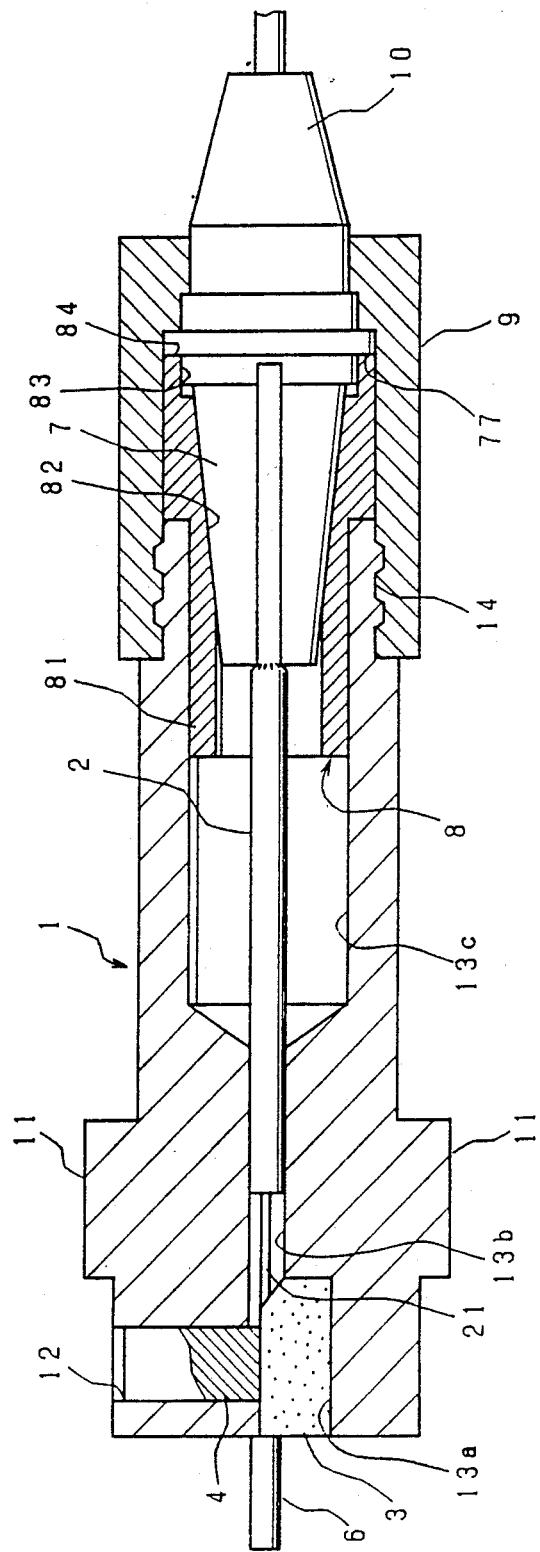
FIG. 15 is a partially cutaway longitudinal cross sectional view showing a seventh embodiment of the present invention.
Figure 16:
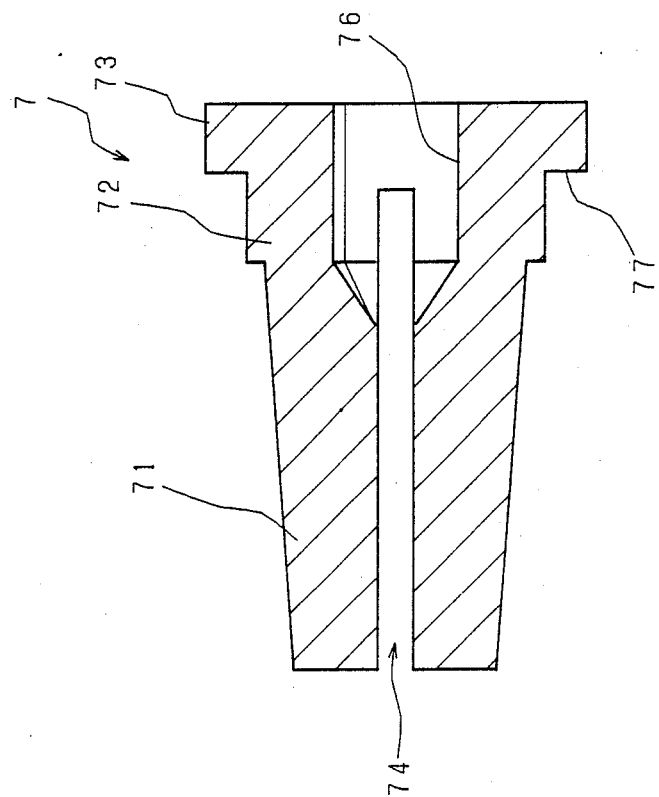
FIG. 16 is a longitudinal cross sectional view of a wedge incorporated in the seventh embodiment of the present invention.

FIG. 15 is a partially cutaway longitudinal cross sectional view showing a seventh embodiment of the present invention. FIG. 16 is a longitudinal cross sectional view of the wedge 7 adopted in the seventh embodiment. The arrangement of the front end portion of the ferrule 1, alignment member 3, deformable metal member 4, sleeve 9, and boot 10 in the seventh embodiment is similar to that of the first embodiment and will be omitted in description.

The ferrule 1 has a radially reduced portion 14 formed in the rear end portion thereof. A cylindrical retention member 8 includes an enlarged portion having an outer diameter approximately equal to the outer diameter of the reduced portion 14 and a reduced portion having an outer diameter approximately equal to the inner diameter of the enlarged opening 13c of the ferrule 1. Its reduced portion is inserted into the enlarged opening 13c so that the front end of its enlarged portion can come into contact with the rear end of the reduced portion 14. Although the retention member 8 formed of plastic material is inexpensive, it may be formed of metal. The reduced portion of the retention member 8 is provided with a small diameter opening 81 formed in the front end thereof so as to have an inner wall thereof in axially parallel arrangement. The enlarged portion of the retention member 8 is provided with a round opening 83 formed in the rear end thereof. The small diameter opening 81 is communicated with the round opening 83 by a conical opening 82 reduced in diameter at the front end and extending between the reduced portion and the enlarged portion in the retention member 8.

The wedge 7 is inserted from rear into the retention member 8. The wedge 7 of truncated-conical shape, as well as one in the previous embodiment, comprises the conical section 71 at front, the cylindrical section 72, and the flange section 73 adjoined to one another. The conical section 71 is tightly fitted into the conical opening 82 of the retention member 8 while the outer diameter of the flange section 73 and that of the cylindrical section 72 are equal to the outer diameter of the enlarged portion and the diameter of the round opening 83 of the retention member 8 respectively. Similarly, the cylindrical and flange sections 72, 73 incorporate the slit 74 and its communicating opening 76 formed therein. The diameter of the opening 76 is nearly equal to the width of the optical fiber ribbon 2.

The optical fiber ribbon 2 is coaxially mounted across the wedge 7 arranged as described above. As the wedge 7 is inserted into the retention member 8, its conical section 71 fits closely in the conical opening 82 and thus, the slit 74 becomes narrowed. This allows the optical fiber ribbon 2 to be uniformly stressed and securely retained. The wedge 7 is restricted in the retention member 8 with its front end 77 of flange section 73 coming into contact with the rear end 84 of the retention member 8. As a result, the optical fiber ribbon 2 is prevented from excessive tightening and remains fastened under a constant pressure.

Figure 17:
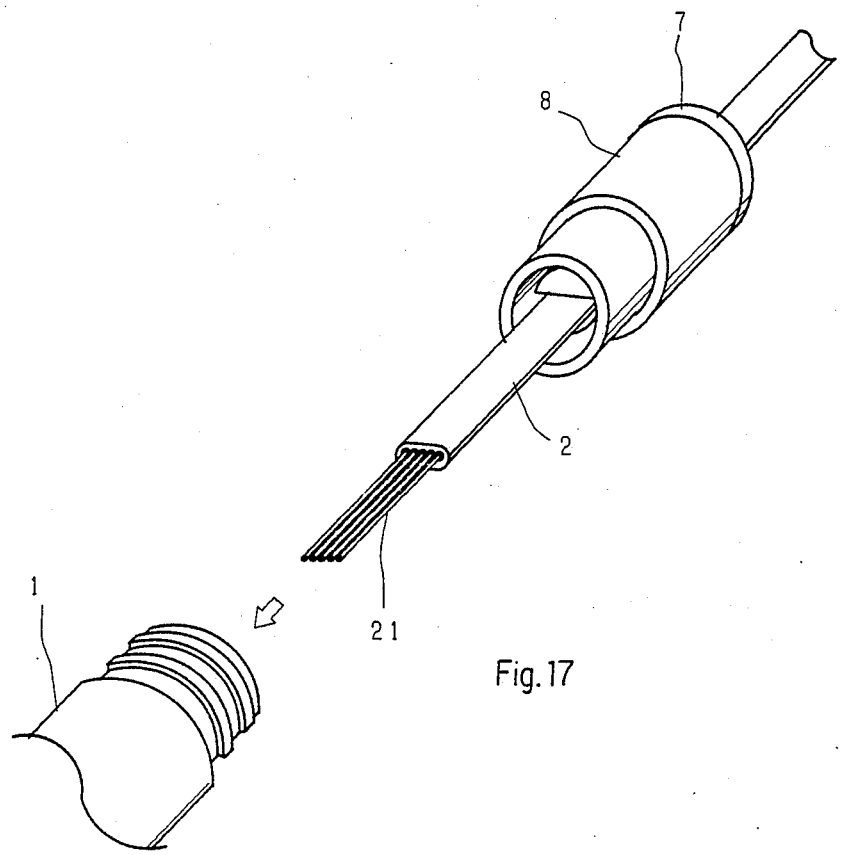
FIG. 17 is a perspective view showing a procedure of attaching in relation to the seventh embodiment of the present invention.

A method of attaching the connector according to the seventh embodiment will be described. The optical fiber ribbon 2 fastened to the wedge 7 and the retention member 8 is fitted into the ferrule 1, as shown in FIG. 17. The optical fibers in the front end portion of the optical fiber ribbon 2 are then fixedly retained in parallel between the alignment member 3 and the deformable metal member 4. Finally, the extensions of the optical fibers 21 projecting from the front face of the ferrule 1 are cut away, if necessary, ground off.

Figure 18:
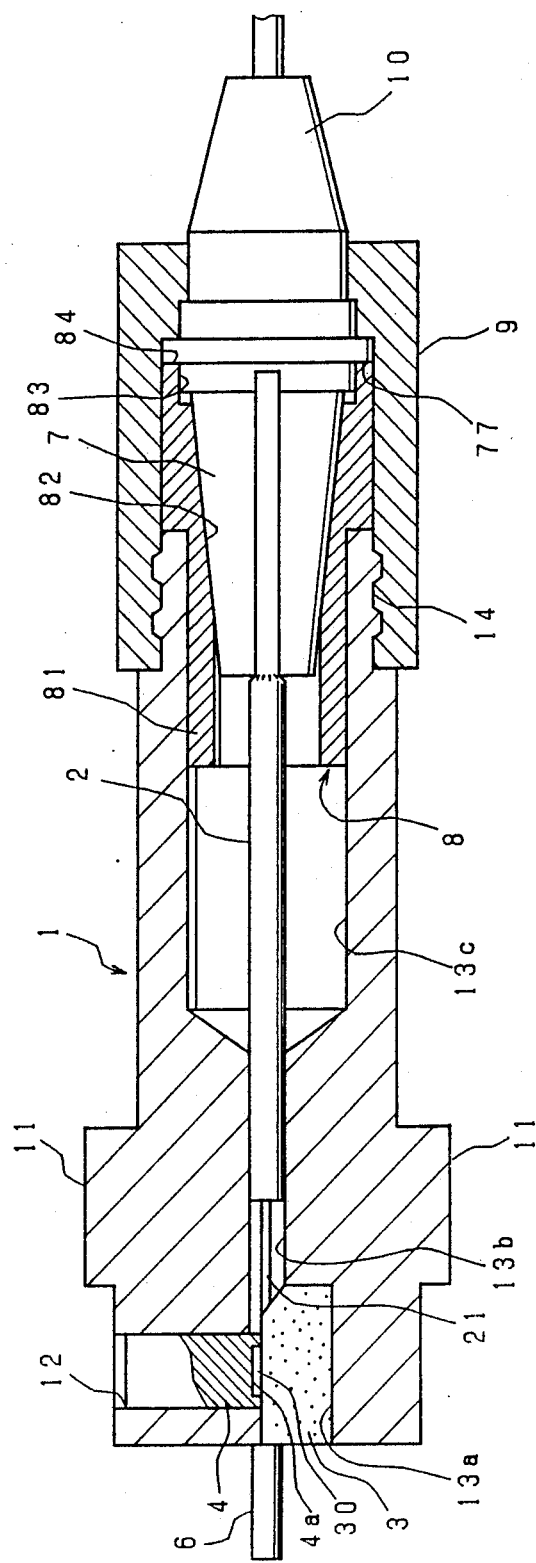
FIG. 18 is a partially cutaway longitudinal cross sectional view showing an eight embodiment of the present invention.

FIG. 18 is a partially cutaway longitudinal cross sectional view showing an eighth embodiment of the present invention which employs the nonslip powder 30 adapted to the arrangement of the seventh embodiment. Similar components are represented by similar numbers in the embodiments and will be omitted in description.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A connector for connecting optical fiber ribbons to each other, each of the ribbons including a plurality of optical fibers in a line, comprising:
    an alignment member for placing each optical fiber which is exposed by skinning off the sheath of the front end portion of the optical fiber ribbon in grooves formed in parallel therein;
    a pressing means for pressing said optical fiber to said alignment member; and
    a ferrule which has a space to hold said alignment member and a slot being open at said space and the periphery thereof at the front end portion and retains unexposed portion of the optical fiber ribbon at the rear end portion;
    said pressing means being made of metal and being more deformable than said optical fiber and being pressed into said slot.

2. A connector as defined in claim 1, further comprising:
    a retention member fitted in the rear end portion of said ferrule and having a conical hole; and
    a ribbon holding member fitted in said conical hole and having a bore through which the optical fiber ribbon is inserted;
    said ribbon holding member being truncated conically with axial slits and the diameter being reducible when fitted in said retention member.

3. A method of attaching a connector for optical fiber ribbon according to claim 2, comprising the steps of:
    exposing optical fibers by skinning off a sheath of a front end portion of the optical fiber ribbon;
    holding the unexposed portion of the optical fiber ribbon with said ribbon holding member and retention member;
    fitting a unit of the optical fiber ribbon fixedly kept by said ribbon holding member and retention member in the rear end portion of said ferrule;
    securing the optical fibers between said alignment member and said pressing means while their respective front end portions project to an extent from the front face of said ferrule; and cutting the front ends of the optical fibers at the front end of said ferrule.

4. A method of attaching a connector for optical fiber ribbon as defined in claim 3, before said step of securing, further comprising a step of:
interposing nonslip powder between said optical fibers and pressing means.

5. A connector as defined in claim 1, wherein said ferrule has a key and a conical hole in the rear end thereof;
and further comprising:
a ribbon holding member disposed in said conical hole of said ferrule and having a key way formed in the flange part thereof for engagement with the key of said ferrule, the flange being provided on the outer periphery of the rear end thereof,
said ribbon holding member being truncated conically with axial slits and the diameter being reducible when fitted in said ferrule.

6. A method of attaching a connector for optical fiber ribbon according to claim 5, comprising the steps of:
exposing optical fibers by skinning off a sheath of a front end portion of the optical fiber ribbon;
inserting the optical fiber ribbon into said ribbon holding member and ferrule;
fitting said ribbon holding member in said ferrule with its key way engaging with the key of said ferrule;
securing the optical fibers between said alignment member and said pressing means while their respective front end portions projecting to an extent from the front face of said ferrule; and
cutting the front ends of the optical fibers at the front end of said ferrule.

7. A method of attaching a connector for optical fiber ribbon as defined in claim 6, before said step of securing further comprising a step of:
interposing nonslip powder between said optical fibers and said pressing means.

8. A connector as defined in claim 1, further comprising:
nonslip powder provided between said optical fibers and said pressing means.

9. A connector as defined in claim 8, further comprising:
a retention member fitted in the rear end portion of said ferrule and having a conical hole; and
a ribbon holding member fitted in said conical hole and having a bore through which the optical fiber ribbon is inserted;
said ribbon holding member being truncated conically with axial slits and the diameter being reducible when fitted in said retention member.

10. A connector as defined in claim 8, wherein said ferrule has a key formed in the rear end thereof;
and further comprising:
a ribbon holding member disposed in a conical hole formed at the rear end portion of said ferrule and having a key way formed in the flange part thereof for engagement with the key said ferrule, the flange being provided on the outer periphery of the rear end thereof,
said ribbon holding member being truncated conically with axial slits and the diameter being reducible when fitted in said ferrule.

11. A connector as defined in claim 8, wherein said nonslip powder consists of ceramic particles having a diameter of less than 0.5 $\mu$m.

12. A connector as defined in claim 8, further comprising:
a pressing member for pressing on said pressing means in said slot.

13. A connector as defined in claim 8, further comprising:
a ring fitted onto the front end portion of said ferrule.

14. A connector as defined in claim 1, wherein said pressing means, is made of one selected from a group of lead, indium, tin, zinc, solder and soft copper.

15. A connector as defined in claim 1, further comprising:
a pressing member for pressing on said pressing means in said slot.

16. A connector as defined in claim 1, wherein said alignment member has a sloping face provided on the rear end of a grooved side thereof as sloping down to the rear end.

17. A connector as defined in claim 1, further comprising:
a ring fitted onto the front end portion of said ferrule.

* * * * *